(12) United States Patent
Rupaner et al.

(10) Patent No.: US 6,337,131 B1
(45) Date of Patent: Jan. 8, 2002

(54) CORE-SHELL PARTICLES AND PREPARATION AND USE THEREOF

(75) Inventors: Robert Rupaner, Guaratingueta (BR); Reinhold J Leyrer, Dannstadt; Peter Schuhmacher, Mannheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/299,071

(22) Filed: Apr. 26, 1999

(30) Foreign Application Priority Data

May 4, 1998 (DE) ......................................... 198 20 302

(51) Int. Cl.[7] ................................................. B32B 5/16
(52) U.S. Cl. ........................ 428/403; 428/407; 428/212; 523/201
(58) Field of Search ................................. 428/403, 407, 428/212; 523/201

(56) References Cited

U.S. PATENT DOCUMENTS

| 4,391,928 A | | 7/1983 | Herman et al. | |
| 4,434,010 A | | 2/1984 | Ash | |
| 4,683,269 A | | 7/1987 | Aksman | |
| 5,002,854 A | * | 3/1991 | Fan et al. | 430/270 |
| 5,053,441 A | * | 10/1991 | Biale | 523/201 |
| 5,219,943 A | * | 6/1993 | Akasaki et al. | 525/273 |
| 5,364,557 A | | 11/1994 | Faris | |

FOREIGN PATENT DOCUMENTS

| DE | 197 27 060 | | 1/1999 |
| EP | 0 292 261 | | 11/1988 |
| EP | 0 399 729 | | 11/1990 |
| EP | 0 441 559 | | 8/1991 |
| EP | 0 639 590 | | 2/1995 |
| EP | 0441559 | * | 1/1996 |
| WO | WO 95/32247 | | 11/1995 |
| WO | WO 96/02597 | | 2/1996 |

OTHER PUBLICATIONS

Y.S. Kim, "Synthese Und Charakterisierung Von Mehrphasigen Polymeren Latices Mit Kern/Schale–Morphologie", 1993, English Abstract Only.

W.M. Billig–Peters, pps. 174–175, "Kern–Schale–Polymere Mit Hilfe Polymerer Azoinitiatoren", 1991, English Summary Only.

K. Landfester, three pages and pps. 9–22, 269–270, "Synthese Und Charakterisierung Von Kern–Schale Latices Mit Elektronenmikroskopie Und Festkörper–NMR", 1995, With Partial English Translation.

T. Okubo, Prog. Polym. Sci., vol. 18, pps. 481–517, "Polymer Colloidal Crystals", 1993.

V.W. Luck, et al., pps. 279–293, "Monodisperse Latices ALS Kristallmodelle", 1960, With English Abstract.

K.J. O'Callaghan, et al., Journal of Polymer Science: Part A: Polymer Chemistry, vol. 33, pp. 1849–1857, "Emulsion Polymerization of Supermicron, Monodisperse Acrylic Copolymer Particles with Core–Shell Structures", 1995 (even pages will be filed later).

J.M. Weissman, et al., Science, vol. 274, pps. 959–960, "Thermally Switchable Periodicities and Diffraction from Mesoscopically Ordered Materials", Nov. 8, 1996.

W. Mächtle, Makromol. Chem., vol. 185, pps. 1025–1039, "Charakterisierung Von Dispersionen Durch Gekoppelte $H_2O/D_2O$–Ultrazentrifugenmessungen", 1984, With English Summary.

R.C. Backus, et al., Journal of Applied Physics, vol. 19, p. 1186–1187, "Some Uses of Uniform Sized Spherical Particles", 1948, English Abstract Only.

Brantrup–Immergut, Handbuch der Technischen Polymerchemie, pps. 664–665, "13.1.2 Aufbau Der Mischungen", 1993, With English translation.

* cited by examiner

*Primary Examiner*—Hoa T. Le
(74) *Attorney, Agent, or Firm*—Oblon, Spivak, McClelland, Maier & Neustadt, P.C.

(57) ABSTRACT

Disclosed are core-shell particles, whose core and shell materials are capable of forming a two-phase system, the shell material being filmable, the core being essentially form-stable under shell-filming conditions and being only very minimally swellable by the shell material, if at all, the cores having a monodisperse size distribution, and there being a difference between the refractive indices of the core material and of the shell material of at least 0.001. Also disclosed are the preparation of the core-shell particles and their use for preparing effect colorants.

41 Claims, 1 Drawing Sheet

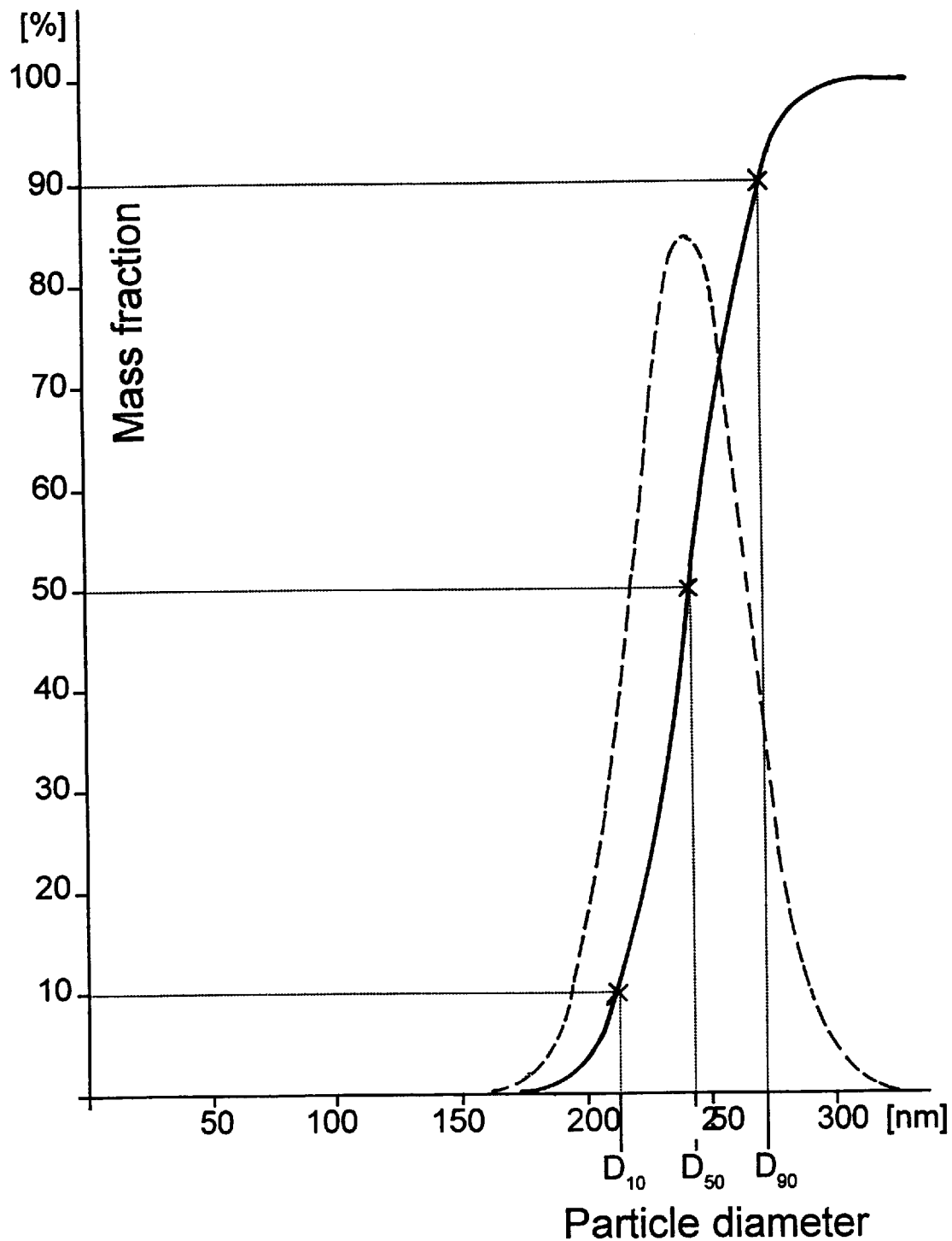

CORE-SHELL PARTICLES AND PREPARATION AND USE THEREOF

The present invention relates to core-shell particles whose shell is filmable while the core is essentially form-stable under shell-filming conditions and whose core and shell materials differ in refractive index, to their preparation and to preparations of these particles.

This invention further relates to the use of these particles and their preparations for preparing organic effect colorants which, in a continuous matrix phase, the filmed shell material, have at least domains of regularly arrayed cores of the core-shell particles. This invention finally relates to the use of the core-shell particles of the invention or of the preparations mentioned for preparing decorative and/or protective coatings, and to the preparation of paints and inks, including printing inks, comprising the core-shell particles of the invention as latent effect colorants.

Polymeric core-shell particles have been recommended for preparing adhesives, binder systems and especially also as reinforcing materials in the production of certain groups of composite materials. Such composite materials are composed of a polymeric matrix with embedded reinforcing elements. One problem with making such materials of construction is to establish a positive bond between matrix and reinforcing materials. Such a bond is necessary if forces are to be transferred by the matrix to the reinforcing elements. The greater the difference in the mechanical properties of matrix and reinforcing materials, elasticity, hardness and deformability, the greater the likelihood of the matrix becoming detached from the reinforcing elements. This danger is to be confronted by sheathing the polymeric reinforcing particles with a second polymer material which is more similar to the matrix material and therefore able to enter a stronger bond with the matrix (Young-Sam Kim, "Synthese und Charakterisierung von mehrphasigen polymeren Latices mit Kern/Schale-Morphologie", University of Karlsruhe thesis, Verlag Shaker Aachen, (1993), pages 2–22). It has also been recommended that the sheathing polymer be grafted onto the reinforcing polymer so as to use covalent bonds to stop the shell becoming detached from the reinforcing particles (W.-M. Billig-Peters, "Kern-Schale-Polymere mit Hilfe polymerer Azoinitiatoren", University of Bayreuth thesis (1991)).

The specific preparation of core-shell polymers is generally effected by stepwise emulsion polymerization, a first step of preparing a latex of core particles and a second step of preparing the shell polymer, the core particles acting as "seed particles" onto whose surface the shell polymers become preferentially deposited.

The deposit can grow into a more or less symmetrical shell on the core particles, but it is also possible for irregular deposits to take place, the structures formed having a blackberrylike appearance. A good overview of the preparation of biphasic polymer particles and related phenomena, especially the formation of core-shell particles, may be found in the thesis of Katharina Landfester, "Synthese und Charakterisierung von Kern-Schale-Latices mit Elektronenmikroskopie und Festkörper-NMR", University of Mainz (1995).

Effect colorants are colorants whose color, lightness and/or reflectivity vary with the viewing angle. They generally have a platelet-shaped structure, i.e., the thickness of the pigment particles is distinctly less than their lateral dimension.

Well known examples of effect colorants are aluminum flakes or pigments which are commercially available under the names of ®Mica, ®Iriodin or ®Paliochrom.

Metallic effect pigments, e.g., aluminum flakes, create a specular effect when viewed perpendicularly; there is no specular effect when viewed from the side. The result is therefore a light-dark effect. The same phenomenon is obtained with mica-based effect pigments.

Iriodin and Paliochrom pigments further have augmented interference effects or self-absorption. As well as the light-dark effect, they are also observed to shift somewhat in hue with the viewing angle (reference: Dr. U. Zorll, Perlglanzpigmente, Vinantz Verlag, ISBN 3-87870-429-1).

U.S. Pat. No. -4,434,010 discloses inorganic pigments which give rise to very pronounced color flops. These pigments are characterized by an extremely homogeneous construction composed of layers having different refractive indices. This construction leads to pronounced interference effects, which are utilized for color creation. However, the making of these pigments is difficult and only possible by means of complicated and costly production processes.

U.S. Pat. No. -5,364,557 discloses organic effect pigments based on cholesteric liquids. Here, an interference effect is obtained from a helical superstructure. Again, the necessary starting materials are complicated to produce and hence very costly. The pigments are produced from cholesteric liquid crystals (CLCs) by applying the cholesteric material to a carrier web in a thin layer, conducting a photochemical polymerization in the CLC phase, detaching the resulting film from the web, and grinding the detached film. As well as the costlier production of the starting materials, this process has a very serious disadvantage in that, during the production process, very great attention has to be paid to the orientation of the CLCs, since even minuscule impurities can have an adverse effect on it.

A process for coating and printing substrates by utilizing cholesteric liquid crystals is known from WO 96/02597. In this process, one or more liquid crystal compounds, of which at least one is chiral and which have one or two polymerizable groups, are applied to a substrate together with suitable comonomers—and additionally a dispersant if the mixture is applied by printing—and copolymerized.

The layers thus obtained, if they are brittle, can be detached from the substrate, comminuted and used as pigments. Furthermore, aqueous monodisperse polymer dispersions are known, for example from T. Okubu, Pro-. Polym. Sci. 18 (1993) 481–517; and W. Luck, H. Wesslau, Festschrifi for Carl Wurstier, BASF 1960, C.A.:55:14009d, which in liquid form, if necessary after purification, tend to pronounced latex crystallization and thereby lead to color effects.

A multiplicity of publications are known regarding the field of the preparation of monodisperse particles, for example EP-A-0 639 590 (preparation by precipitation polymerization), A. Rudin, J. Polymn. Sci., A:Polym. Sci. 33 (1995) 1849–1857 (monodisperse particles with core-shell structure), EP-A-0 292 261 (preparation by addition of seed particles).

EP-A-0 441 559 describes core-shell polymers having different refractive indices in the layers and their use as additives in paper coating comnpositions.

More recently, heat-controlled optical switching elements have been disclosed (SCIENCE 274 (1996), 959–960), which utilize the temperature dependence of the particle size of poly(N-isopropylacrylamide) dispersions or of the volume/temperature relationship of poly(N-isopropylacrylamide) gels. A first embodiment of these switches consists of an aqueous poly(N-isopropylacrylarnide) dispersion whose particles form a lattice-shaped arrangement and are significantly larger below the phase transition temperature than thereabove. The consequence is that the absorbance at about 530 nm increases steeply within the temperature range between 10 and 40° C. The system thus acts as an optical switch and limiter.

In a second embodiment, highly charged polystyrene particles which form a spatial lattice are embedded in a poly(N-isopropylacrylamide) hydrogel. A change in temperature will alter the volume of the hydrogel and hence the lattice spacing, of the polystyrene particles. The consequence is that the position of the absorption maximum shifts from about 700 to about 460 nm when the temperature changes from about 10 to about 40° C. This system can be used as a tunable optical filter. These materials are naturally unsuitable for use as colorants or pigments.

It is an object of the present invention to provide a material from which organic effect colorants are simple and inexpensive to produce. The effect colorants obtained shall have good general fastnesses, especially be free of any tendency to swell in organic and aqueous media.

We have found that this object is achieved by the hereinbelow described core-shell particles and their preparations.

The invention accordingly provides organic core-shell particles, whose core and shell materials are capable of forming a two-phase system, the shell material being filmable, the core being essentially form-stable under shell-filming conditions and being only very minimally swellable by the shell material, if at all, and there being a difference between the refractive indices of the core material and of the matrix formed in the course of the filming of the shell material.

'Essentially form-stable' with regard to the cores means that their shape and size does not change sufficiently in the course of filming to prevent the core-shell particles being used for preparing effect colorants. In general, changes of up to ±10% in their dimensions are permissible without serious disadvantages. "Low swellability" of the cores by the shell material means that the average diameter of the cores increases by not more than 10% of the original value when the cores are embedded in the shell material. It is particularly advantageous for the cores to exhibit only little swellability, if any, not only in the shell material itself, but also in solutions, dispersions or melts or in liquid precursors thereof.

An essential requirement is the difference An in the refractive index between the core material and the matrix which is formed in the course of the filming of the shell material of the core-shell particles of the invention. The difference is at least 0.001, preferably at least 0.01, especially at least 0.1, units.

The core material can have the higher refractive index and the matrix the lower, or vice versa, preferably the former.

In the core-shell particles of the invention, the weight ratio of core:shell is within the range from 1:1 to 20:1, preferably within the range from 2:1 to 10:1, especially within the range from 2.5:1 to 5:1.

It is important for the contemplated use of the core-shell particles of the invention for preparing effect colorants that the shell material be filmable, i.e., that it may by simple measures be softened, viscoelasticized or liquefied to such an extent that the cores of the core-shell particles are able to form at least domains of regular order. The filmed shell material then forms (depending on its mass fraction in the core-shell particles) either a continuous phase which fills out all interstitial spaces between the core particles, a matrix, or adhesive dots in the region of the contact points between the core particles, which adhesive dots fix the core particles in a regular arrangement. (The shell material may therefore also be referred to under the synonyms of matrix material or matrix phase.) The cores arrayed in a regular order in the matrix formed by the filming of the shell of the core-shell particles form a diffraction grating which creates interference phenomena and thereby leads to very interesting color effects.

The cores of the core-shell particles of the invention have an essentially spherical, preferably globular, shape. They form the aforementioned macroscopic domains of crystal-like structure during the filming as the shell material liquefies or softens. In many cases, the cores within this structure form a close spherical packing.

The cores of the core-shell particles of the invention have a size within the range from 100 to 700 rnm, preferably within the range from 150 to 500 nm, especially within the range from 200 to 400 nm. They preferably have a monodisperse distribution, i.e., are present in a narrow particle size distribution.

The particle size distribution is characterized by means of the polydispersity index PDI, which is defined by the following formula:

$$PDI=(D_{90}-D_{10})/D_{50}$$

In this formula, $D_{90}$, $D_{50}$ and $D_{10}$ are respectively the particle diameters at which the integral of the distribution function $dG=f(D)*dD$, where G is the polymer mass and D is the particle diameter, is equal to 0.9 (=90% by weight), 0.5 (=50% by weight) and 0.1 (=10% by weight) of the total mass of the polymeric substance.

The accompanying FIGURE illustrates this relationship. It shows the curve of the distribution function of the particle sizes of a polymer dispersion as a broken line in a coordinate system where the particle sizes (D) have been plotted on the abscissa and the mass fractions (G) of the j particles of a given size on the ordinate.

It further shows, in the same coordinate system, the solid curve of the integral of the distribution function on which the points for 10, 50 and 90% mass fraction and the associated points $D_{10}$, $D_{50}$ and $D_{90}$ of the particle diameters are marked by crosses.

As a particle size distribution narrows, the PDI approaches zero; the broader, i.e., the greater the polydispersity of, the particle size distribution, the larger the PDI.

The particle size distribution can be determined in a conventional manner, for example by means of an analytical ultracentrifuge (see for example W. Mächtle, Makromol. Chem. 185 (1984), p. 1025–1039) and the PDI can be calculated from the values obtained. True, the polydispersity values obtained by the two methods are not directly comparable, but they are both suitable for characterizing the particle distribution of polymer dispersions. Core particles suitable for the present invention have PDIs below 0.4, preferably below 0.3, especially below 0.2.

The materials of core and shell can be inorganic, organic, metallic or hybrid materials, provided they meet the above-specified conditions.

However, with regard to the desirability of being able to vary relevant properties of the cores of the core-shell particles of the invention as required, it is advantageous for the cores to comprise or consist of one or more polymers and/or copolymers (core polymers).

The cores preferably comprise a single polymer or copolymer. For the same reason, it is advantageous for the shell of the core-shell particles of the invention likewise to comprise one or more polymers and/or copolymers (shell polymers; matrix polymers) or polymer precursors and optionally auxiliary and additive substances, the shell composition being choosable in such a way that the shell, when in a nonswelling environment at room temperature, is essentially form-stable and nontacky.

The shell material may include auxiliary and/or additive substances in a proportion of up to 40% by weight, preferably up to 20% by weight, especially within the range from 5 to 20% by weight, of the shell weight.

The core and shell of the particles of the invention preferably consist of the above-specified constituents in the specified mass fractions. The sum total of the percentages specified for individual components of a reference system (e.g., "core material" or "shell material") is of course 100% for each individual reference mixture.

The use of polymeric substances as core and shell materials gives the person skilled in the art the freedom to define their relevant properties, for example their composition, the particle size, the mechanical data, the refractive index, the glass transition temperature, the melting point and the weight ratio of core:shell and hence also the application properties of the core-shell particles, which ultimately also affect the properties of the effect colorants produced therefrom.

Polymers and/or copolymers making up the core material in whole or in part are high molecular weight compounds which conform to the specification given above for the core material. Suitable polymers and copolymers include not only addition polymers and copolymers of polymerizable unsaturated monomers, but also poly-condensates and copolycondensates of monomers having two or more reactive groups, e.g., high molecular weight aliphatic, aliphatic/aromatic or wholly aromatic polyesters, polyamides, polycarbonates, polyureas and polyurethanes, but also amino and phenolic resins, for example melamine-formaldehyde, urea-formalde-hyde and phenol-formaldehyde condensates.

The polymers of the core material are advantageously crosslinked (co)polymers, since these best meet the minimal swellability requirement. They also promote the formation of core-shell structures when the core-shell particles of the invention are being prepared. These crosslinked polymers can either have already been cross-linked in the course of the addition (co)polymerization or (co)polycondensation, or have been aftercrosslinked in a separate step following the actual addition (co)polymerization or (co)polycondensation.

A detailed description of the chemical composition of suitable polymers follows later hereinbelow.

To confer a very wide application spectrum on the core-shell particles of the invention, it is advantageous for the shell material likewise to comprise or consist of one or more polymers and/or copolymers. It is preferable, especially for economic reasons, for the shell material to comprise or consist of one polymer.

Useful polymers for the shell material are in principle, as for the core material, polymers of the classes mentioned above, provided they are selected or constructed in such a way that they meet the specification given above for the shell polymers.

Accordingly, they have to have a refractive index which differs distinctly from that of the core polymers, i.e., low refractive shell polymers have to be used with high refractive core polymers, and vice versa. Furthermore, they should not tend to swell or dissolve the cores.

It is a further requirement of shell polymers that they either be softenable or liquefiable by simple measures by undecomposed melting—if necessary with the assistance of auxiliary and/or additive substances present in the shell or separately added to the core-shell particle powders prior to use—or producible from polymer precursors (prepolymers, monomers) which are part of a softenable or liquefiable shell material. The softening or liquefication, as explained above, shall be sufficient for the cores of the core-shell particles to be able to form at least domains of regular order.

Prepolymers for the purposes of this invention are polymers having a low or medium degree of polymerization which can be converted into the desired polymers by further condensation or crosslinking.

However, it is convenient and desirable for many applications of the powders of the invention, especially for the preparation of effect colorants or protective coatings, for the shell too to comprise or consist of a polymer material which, after formation of the continuous matrix or the matrix which holds the cores through dot bonds, i.e., after "film formation", to have minimal solubility or swellability in organic solvents and/or water. For particularly useful applications of the powders of the invention, for example for the production of high stability pigments or of decorative and/or protective coatings, it is therefore desirable for the polymers of the shell to be crosslinked as well.

This crosslinking can be effected via the same polyfunctional monomers as in the case of the core polymers, taking, account of the required refractive index differences.

The crosslinker substances—a detailed description follows hereinbelow—can be part of the shell material, they can be separately added to the core-shell particle powder prior to its use, i.e., prior to filming, or they can be applied subsequently, after filming, (postcrosslinking).

It is favorable for certain applications, as for the production of coatings or colored films, for the polymer material of the shell of the core-shell particles of the invention which forms the matrix phase to be an elastically deformable polymer, for example an addition polymer having a low glass transition temperature.

In this case, the color of a layer of the colorant of the invention can be made to vary in response to elongation and compression.

Interesting, application properties are also possessed by those core-shell particles of the invention which film to form effect colorants which exhibit a dichroism.

Polymers which meet the specifications for a matrix material are likewise members of the groups of the addition polymers and copolymers of polymerizable unsaturated monomers and also of the polycondensates and copolycondensates of monomers having two or more reactive groups, e.g., high molecular weight aliphatic, aliphatic-aromatic or wholly aromatic polyesters and polyamides, but also of the amino and phenolic resins, such as melamine-formaldehyde, urea-formaldehyde and phenol-formaldehyde condensates, which dry with further condensation and considerable crosslinking. The same applies to epoxy resins, consisting, for example, of mixtures of polyepoxies and polyamines or polyols, which dry to solid resinous materials.

Epoxy resins are typically prepared by mixing epoxy prepolymers, obtained for example by reaction of bisphenol A or other bisphenols, resorcinol, hydroquinone, hexanediol or other aromatic or aliphatic di- or polyols or phenol-formaldehyde condensates or mixtures thereof with epichlorohydrin, dicyclopentadiene diepoxide or other di- or polyepoxies, with further condensation-capable compounds directly or in solution and allowing the mixture to cure.

With regard to the above conditions of the properties of shell (=matrix) polymers, selected building blocks from all groups of organic film-formers are in principle suitable for their preparation.

Shell polymers which are soluble, or at least well swellable, in organic solvents and which therefore are used with advantage as film-formers for matrices which bind by drying on are, for example, modified or moderately high molecular weight polyesters, cellulose esters such as cellulose acetobutyrate, polyurethanes, silicones, polyether or polyester-modified silicones.

Some further examples may illustrate the broad range of polymers suitable for preparing the shell.

Scenario 1: If the core material is to have a high refractive index and the matrix a low refractive index, then suitable shell polymers include for example UF resins, drying and filming polymer dispersions, addition polymers such as polyethylene, polypropylene, polyethylene oxide, polyacrylates, polymethacrylates, polybutadiene, polymethyl methacrylate, polytetrafluoroethylene, polyoxymethylene, polyesters, polyamides, polyepoxies, polyurethane, rubber, polyacrylonitrile and polyisoprene.

Scenario 2: If the core material is to have a low refractive index and the matrix a high refractive index, suitable shell polymers include for example addition polymers having a preferably aromatic base structure such as polystyrene, polystyrene copolymers such as SAN, aromatic-aliphatic polyesters and polyamides, aromatic polysulfones and polyketones, PF and MF resins, polyvinyl chloride, polyvinylidene chloride and also—given a suitable choice of a high refractive core material—polyacrylonitrile or polyurethane.

As explained above, the core-shell particles of the invention may, if it is technically advantageous, include auxiliary and additive substances in the shell material to optimize the performance data and properties desired or required for application and processing. Examples of such auxiliary and/or additive substances are plasticizers, film formation assistans, flow agents, fillers, melting assistants, coupling agents, release agents, application assistants and viscosity mofifiers, e.g., thickeners.

Particularly useful is the addition of auxiliaries for film formation and film modification based on compounds of the formula HO—$C_nH_{2n}$—O—($C_nH_{2n}$—O—$)_m$H, wherein n is an integer of from 2 to 4, preferably 2 or 3, and m is an integer of from 0 to 500. Integer n can vary along the chain and the different chain-members can be present in a random or blockwise distribution. Examples for such auxiliaries are ethylene glycole, propylene glycole, di-, tri-or tetraethylene glycole, di-, tri- or tetrapropylene glycole, polyethylene oxide, polypropylene oxide and ethylene oxide/propylene oxide—mixed polymers having a molecular weight up to about 15000 with a random or blockwise distribution of the ethylene oxide and propylene oxide chain members.

Also, if appropriate, organic or inorganic dissolving, dispersing or diluting agents which, for example, prolong the pot life of the formulation, i.e. the time available for application to the substrate, waxes or hotmelt adhesives are suitable additives.

The addition polymers, especially of the shell material, can, if desired, also be admixed with stabilizers against UV radiation and weathering. These include, for example, derivatives of 2,4-dihydroxybenzophenone, derivatives of 2-cyano-3,3'-di-phenyl acrylate, derivatives of 2,2',4,4'-tetrahydroxybenzophenone, derivatives of o-hydroxyphenylbenzotriazole, salicylic esters, o-hydroxyphenyl-s-triazines or sterically hindered amines. These substances too can be used singly or as mixtures.

The total amount of the auxiliary and/or additive substances optionally to be used to set optimal properties can, but need not, be part of the shell material of the core-shell particles. On the contrary, the auxiliary and/or additive substances may also, in whole or in part, be added to the core-shell particle powders separately, for example subsequently. This addition can take place either immediately prior to the use of the core-shell particles of the invention by the processor or in the course of manufacture, so that the processor is supplied with readily processible preparations for the core-shell particles of the invention.

The total amount of the auxiliary and/or additive substances is up to 40% by weight, preferably from 1 to 30% by weight, especially from 5 to 20% by weight, of the weight of the preparation.

These preparations likewise form part of the subject-matter of this invention. They may also include additional monomers or prepolymers which, in terms of amount and mass fraction, are selected so that they may be converted into the above-described matrix polymers by (co)polymerization. If desired, the preparations may also include additional ready-prepared, optionally even crosslinked, matrix polymers. These additions can contribute additional matrix mass in the course of the filming of the shell of the core-shell particles.

The matrix polymer, optionally in a mixture with auxiliary and/or additive substances, can be deformed, for example by liquefaction, softening or viscoelastic plastification, on the substrate under the filming conditions to such an extent that the formation of domains of regular order of core particles is not hindered and that a continuous matrix or a system of fixing dots between the core particles is formed.

If a preparation also includes crosslinking substances or functional groups, these can be activated by special measures, for example thermally by heating, photochemically by irradiation with actinic, preferably electromagnetic, radiation, by addition of free-radical or cationic initiators or—in the case of crosslinkers which act by condensation or addition reaction—by means of reaction accelerants.

The preparations of the invention may be solid or liquid at room temperature, depending on the nature and the amount of the auxiliary and/or additive substances present in them, preference being given to liquid preparations, as more particularly discussed hereinbelow.

Solid preparations comprise from 70 to 99% by weight, preferably from 80 to 95% by weight, of core-shell particles of the invention and from 30 to 1% by weight, preferably from 20 to 5% by weight, of a mixture of auxiliary and/or additive substances which is solid at standard temperature.

The applicator means available to the processor of the core-shell particles of the invention may dictate a preference for preparations which are solid or else liquid or pasty, spreadable, sprayable and/or pourable at room temperature or at the application temperature. The latter have the advantage that they are simple to apply uniformly to substrates.

Liquid or pasty preparations of the core-shell particles of the invention can be formulated by admixing above-described preparations, if they are solid at room or application temperature, with liquid or low melting, inert, organic or inorganic dissolving, diluting or dispersing substances, preferably those which are also used for formulating paints. Examples of such liquefying additions are alkanes of medium chain length, low-boiling aromatic hydrocarbons, lower alcohols, esters of lower carboxylic acids with lower alkanols, water or mixtures thereof.

Such liquid or pasty preparations of the core-shell particles of the invention as additionally comprise dissolving, diluting or dispersing substances also form part of the subject-matter of the present invention.

The phase of these preparations which is liquid or only becomes liquid at elevated temperature may additionally comprise further auxiliary and additive substances, for example thickeners, dispersion stabilizers, flow agents and other assistants that are required or desirable from an application point of view.

The novel liquid or pasty preparations of the core-shell particles of the invention comprise from 5 to 75% by weight, preferably from 10 to 65% by weight, especially from 20 to 50% by weight, of a core-shell particle as claimed in claim 1 and from 95 to 25% by weight, preferably from 90 to 35% by weight, especially from 80 to 50% by weight, of a mixture of dissolving, dispersing, auxiliary and/or additive substances which is liquid at standard temperature or becomes liquid at elevated temperature. Water is a preferred dispersion medium.

The present invention further provides a process for preparing the above-described core-shell particles of the invention by homogenizing core polymer particles with monomers or prepolymers of the shell polymers in an inert liquid reaction medium, preferably in the presence of protective colloids and/or emulsifiers, and incipiently or completely polymerizing the polymer precursors under polymerization conditions such that the shell polymers or polymer precursors become deposited on the core particles, which comprises selecting the monomers and/or prepolymers according to amount and type in such a way that the shell material be filmable, the core be essentially form-stable under shell-filming conditions and be only very minimally swellable by the shell material, if at all, and there be a difference between the refractive indices of the core material and of the matrix formed in the course of the filming of the shell material.

The liquid reaction medium in which the polymerization or copolymerization is carried out comprises solvent, dispersion or dilution media used in polymerizations, especially in emulsion polymerization processes. The choice is made so that the emulsifiers used for homogenizing the core particle and shell precursors are able to be sufficiently effective and that sufficient solvation and solubility differences exist in the reaction medium between the shell polymers and their precursors. Aqueous media, especially water, are useful as liquid reaction medium for carrying out the process of the invention.

In the practice of the process of the invention, care must be taken to ensure that the monomers and prepolymers which are intended to form the shell in the course of the polymerization do not form separate polymer particles, but are indeed preferentially deposited as shell on the core particles.

The choice of the reaction medium and of the reactants and additions influences the deposition of the shell polymers on the core particles. It is favorable for shell formation for the solubility of the polymers in the reaction medium to be considerably less than that of the precursors when the salvation tendency—the hydrophilicity in an aqueous reaction medium—of the precursors of the shell polymers is greater than or at least equal to that of the core polymer precursors. A high concentration of the core particles and a sufficient amount of the emulsifier favor shell formation. The temperature and type and amount of initiator can also influence shell formation. It is further favorable for the mobility of the polymer chains of the core material to be minimized in order that the interdiffusion of the polymer materials and precursors may be suppressed if possible. It is therefore particularly advantageous to crosslink the core polymers.

It is further particularly advantageous and convenient to add the monomers or prepolymers intended for the shell to the polymerization batch under starved feed conditions.

If the process of the invention is to produce core-shell particles whose shell is substantially free of low molecular weight substances, the polymerization batch does not have added to it any further auxiliary and additive substances apart from the substances absolutely necessary for the course of the polymerization reaction and for the uniform formation of the particle sheath.

The polymerization can be carried on to the complete polymerization of all polymerizable constituents, or it can be discontinued beforehand if the intention is to produce core-shell particles which still contain prepolymers in the shell. Preferably, to the polymer precursors of the shell polymer are completely polymerized.

The core-shell particles obtained can be isolated in a conventional manner, for example by removing the liquid reaction medium. The core-shell particles thus prepared generally form aggregates (microscopic particles possessing high spherical symmetry, in the case of spray drying) on whose surface a surprisingly regular, crystal lattice type array of the core-shell particles of the invention is observable.

The reaction mixtures obtained on completion or discontinuation of the polymerization reaction can also be further processed directly, i.e., without isolation of the core-shell particles. They then represent preparations which, as auxiliary and/or additive substances, merely include the emulsifiers used and the liquid reaction medium. If desired, partial removal of the reaction medium is also possible to increase the core-shell particle content of the preparation if required.

The core polymer particles to be provided in the above-described process for preparing the core-shell particles of the invention can be prefabricated in a separate polymerization process.

However, it is particularly economical for the process to be carried out in a two-step one-pot process, the core polymer particles being prepared from the selected polymer precursors (monomers and/or prepolymers) in the first reaction step and subsequently, without isolation of the core particles, the batch being admixed with the polymer precursors required for shell formation, and optionally with auxiliary and additive substances, and then being further processed as described above.

By removing the liquid reaction medium it is possible to isolate the core-shell particles or preparations comprising auxiliary and/or additive substances. Depending on the nature and the amount of the auxiliary and/or additive substances added, this provides solid, pasty or liquid preparations.

To specifically produce solid preparations, the polymerization of the shell polymers is carried out in the presence of all or some of the auxiliary and/or additive substances present in the preparation and optionally dispersion or diluent media, or these are wholly or partly added during or after the polymerization, in which case the adds are chosen so that their mixture is solid, and the inert reaction medium is removed on completion of the polymerization.

If liquid or pasty preparations are to be produced, it is possible either to completely or partially omit the removal of the liquid reaction medium or, if the removal of the reaction medium has left a solid preparation, subsequently to add back a desired solvent, dispersant or diluent in the requisite amount.

Generally, the pasty or fluidic preparations of the core-shell particles of the invention are produced by performing the polymerization of the shell polymers in the presence of all or some of the auxiliary and/or additive substances present in the preparation and optionally dispersants or diluents, or by adding these wholly or in part during or after the polymerization, in which case the adds are chosen so that their mixture has a fluidic or pasty consistency, and optionally wholly or partly removing the inert reaction medium on completion of the polymerization.

An economically particularly favorable special case of producing fluidic or pasty preparations arises when the inert liquid reaction medium also serves as dispersion and dilution medium in the fluidic or pasty preparation and is at least not completely removed on completion of the polymerization. Of course, the novel solid preparations of the core-shell particles of the invention can be converted into the fluidic or pasty preparations by addition of solvents, diluents or dispersants.

In the production of the core-shell particles of the invention and their preparations, the inert reaction medium is preferably removed by freeze drying or by spray drying or, in the case of previously applied preparations, by evaporation under reduced pressure.

The invention requires materials for the core and the shell, preferably polymer materials, which differ considerably in their refractive index and which consequently have been set specifically either to a relatively high or to a relatively low refractive index.

In addition, the above-identified requirements in respect of chemical stability and physical behavior apply: no or minimal interpenetration of the core and shell materials (i.e., no or minimal swelling), no chemical reactions with the ingredients of the colorants of the invention and surrounding constituents, such as dissolution or hydrolysis. The shell polymers need to be filmable to apply the core-shell particles of the invention, but shall be very inert after matrix formation. Such polymers can be prepared in a conventional manner by addition polymerization, polycondensation or polyaddition of polymerizable and/or copolymerizable or (co)condensable or poly-addition-capable monomers or by higher polymerization or postcondensation or crosslinking of polymeric or oligomeric compounds.

The preparation of the addition polymers for core and shell is not restricted to a specific process. On the contrary, existing polymermaking processes can be used. It is preferable to use the processes of emulsion polymerization, suspension polymerization, microemulsion polymerization or microsuspension polymerization which employ free-radical addition polymerization. They offer the advantage of not being sensitive to moisture.

The addition polymerization can be initiated using addition polymerization initiators which decompose either thermally or photochemically to form free radicals and so initiate the addition polymerization. Of the thermally activable addition polymerization initiators, preference is given to those which decompose within the range from 20 to 180° C., especially within the range from 50 to 80° C.

Particularly preferred addition polymerization initiators are peroxides such as diben-zoyl peroxide, di-tert-butyl peroxide, peresters, percarbonates, perketals, hydroperoxides, but also inorganic peroxides such as $H_2O_2$, salts of peroxosulfuric acid and peroxodisulfuric acid, azo compounds, boron alkyl compounds and also homolytic hydrocarbons.

The initiators and/or photoinitiators which are used in amounts within the range from 0.01 to 15% by weight, based on the polymerizable components, according to the requirements of the material to be polymerized, can be used singly or, to exploit advantageous synergistic effects, in combination.

Appropriate processes have also been described for the preparation of polycondensation products. It is thus possible for the starting materials for the preparation of polycondensation products to be dispersed in inert liquids and, preferably with removal of low molecular weight reaction products such as water or—if lower alkyl diesters of dicarboxylic acids are used for preparing polyesters or polyamides, for example—lower alkanols, to be condensed.

Polyaddition products are obtained in a similar manner by reaction of compounds having two or more, preferably three, reactive groups such as epoxide, cyanate, isocyanate or isothiocyanate groups, with compounds bearing complementary reactive groups. For instance, isocyanates react with alcohols to form urethanes, with amines to form urea derivatives, whereas epoxides react with these complementaries to form, respectively hydroxyethers and hydroxyarnines. Like polycondensations, polyaddition reactions can also be carried out advantageously in an inert solvent or dispersion medium.

Furthermore, aromatic, aliphatic or mixed aromatic/aliphatic polymers, e.g., polyesters, polyurethanes, polyamides, polyureas, polyepoxies or else solution addition polymers, can be dispersed or emulsified (secondary dispersion) in a dispersion medium, for example in water, alcohols, tetrahydrofuran, hydrocarbons, and postcondensed, crosslinked and cured in this state of fine dispersion.

The stable dispersions required for these addition polymerization, polycondensation or polyaddition processes are generally prepared using dispersants.

The dispersants used are preferably water-soluble high molecular weight organic compounds having polar groups, such as polyvinylpyrrolidone, copolymers of vinyl propionate or acetate and vinylpyrrolidone, partially hydrolyzed copolymers of an acrylic ester and acrylonitrile, polyvinyl alcohols having a varying residual acetate content, cellulose ethers, gelatin, block copolymers, modified starch, low molecular weight carboxyl- and/or sulfo-containing addition polymers or mixtures thereof.

Particularly preferred protective colloids are polyvinyl alcohols having a residual acetate content of below 35, especially within the range from 5 to 39, mol % and/or vinylpyrrolidone-vinyl propionate copolymers having a vinyl ester content of below 35, especially from 5 to 30,% by weight.

It is possible to use nonionic or else ionic emulsifiers, singly or mixed. Preferred emulsifiers are optionally ethoxylated or propoxylated longer-chain alkanols or alkylphenols having varying degrees of ethoxylation or propoxylation (e.g., adducts with from 0 to 50 mol of alkylene oxide) or their neutralized, sulfated, sulfonated or phosphated derivatives. Similarly, neutralized dialkyl sulfosuccinates or alkyl diphenyl oxide disulfonates are particularly highly suitable.

It is particularly advantageous to use combinations of these emulsifiers with the abovementioned protective colloids, since they lead to particularly finely divided dispersions being obtained.

Processes for preparing monodisperse polymer particles have been described in the literature (e.g., R. C. Backus, R. C. Williams, J. Appl. Physics 19 (1948), 1186) and can be used with advantage for preparing the core polymers in particular. It is merely necessary to ensure in this connection that the above-specified particle sizes from 0.05 to 5 µm, preferably from 0.1 to 2 µm, especially from 0.15 to 1.0 µm, specifically from 0.2 to 0.7 µm, and a polydispersity index of below 0.6, preferably of below 0.4, especially of below 0.3, are obtained in order, after the orientation of the is core particles, to obtain a lattice which produces Bragg scattering in the visible, near UV or IR region. The aim is to obtain addition polymers which are as uniform as possible.

The requisite combination of properties, such as chemical and mechanical resistance and physical data, is determined by their composition and their degree of polymerization and/or crosslinking. A phase can be made resistant to dissolving or swelling in or by another phase not only by crosslinking the polymers but also by selecting the monomers for the polymers core and shell in such a way as to obtain "molecularly incompatible" polymers which, like oil and water, for example, are inherently devoid of any tendency to interpenetrate because of different $\delta_{LP}$ LP values, i.e., different polarities. The solubility parameters $\delta_{LP}$ characterize the polarity of the compounds in question and have been published for many low molecular weight compounds and polymers (compare Brantrup-Irrmergut, "Polymer Handbook", 3rd edition, J. Wiley, New York, Chapter VII). The larger the difference in $\delta_{LP}$ between core and shell, the lower the molecular mixing or swelling tendency.

The desired property combinations for the required polymers can be set in a controlled manner by adjusting the reaction conditions such as temperature, pressure, reaction time, use of suitable catalyst systems which are known to influence the degree of polymerization in a known manner, and by selecting the monomers according to type and quantity.

The choice of monomer also has a pivotal influence on the light-refracting properties of the polymers.

Monomers which lead to polymers having a high refractive index are generally either those which have aromatic substructures or those which have hetero atoms having a high atomic number, such as halogen atoms, especially bromine or iodine atoms, sulfur or metal ions, i.e., atoms or groups of atoms which enhance the polarizability of the polymers.

Polymers having a low refractive index are accordingly obtained from monomers or monomer mixtures which contain little if any of the aforementioned substructures and/or atoms of high atomic number.

Polycondensates which are suitable for carrying out the present invention include for example in particular polyamides, polyesters, polyurethanes or polycarbonates.

Suitable polyesters consist predominantly, generally to an extent exceeding 80% by weight, of building blocks derived from aromatic dicarboxylic acids and from aliphatic and/or cycloaliphatic diols or from, preferably aromatic, hydroxycarboxylic acids. Commonly used aromatic dicarboxylic acid building blocks are the bivalent radicals of benzenedicarboxylic acids, especially of terephthalic acids and of isophthalic acid; commonly used diols have from 2 to 8 carbon atoms, the diol which has from 2 to 4 carbon atoms being particularly suitable.

Similarly, the aforementioned polyamides, polyureas, polyurethanes and polyesters can be crosslinked or precrosslinked in a similar manner by use of tri- or higher-functionalized compounds to achieve specific combinations of properties. The crosslinking or the completion of a precrosslinking can also be carried out in a separate step following the polycondensation or polyaddition, if desired with the mixing in of a further reactive component.

The polycondensates can be obtained in the form of finely disperse polymers through the choice of suitable reaction conditions and condensation processes. However, they can also be brought into a disperse form, in a separate step, by emulsification.

It is particularly advantageous, and therefore preferable, to carry out the present invention using polymers comprising addition polymers and copolymers obtained by free-radical polymerization, since the broad range of available monomers and crosslinkers enables the person skilled in the art to prepare polymers having any required combination of light-refracting properties and chemical and physical resistance.

A survey of the refractive indices of various commonly used homopolymers may be found for example in Ullmann's Encyklopadie der technischen Chemie, 5th edition, Volume A21, page 169. Examples of free-radically polymerizable monomers which lead to polymers having a high refractive index are:

Group a): styrene, ring-alkylated styrenes, a-methylstyrene, mono- and dichlorosty-rene, vinylnaphthalene, isopropenylnaphthalene, isopropenylbiphenyl, vinylpyridine, isopropenylpyridine, vinylcarbazole, vinylanthracene, N-benzylmethacrylamide, p-hydroxymethacrylanilide.

Group b): acrylates having aromatic side chains, e.g., phenyl (meth)acrylate (=abbreviated notation for the two compounds phenyl acrylate and phenyl methacrylate), benzyl (meth)acrylate, benzyl vinyl ether, and also compounds of the formulae

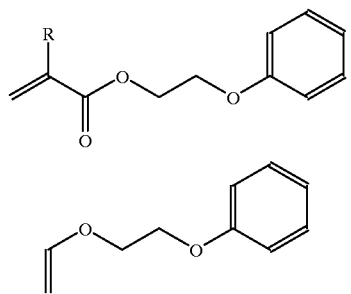

In the formulae above and hereinbelow, carbon chains are represented only by the bonds between the carbon atoms for clarity and simplicity. This is in accordance with the convention of representing aromatic cyclic compounds in which, for example, benzene is represented as a hexagon having alternate single and double bonds.

It is also possible to use such compounds where the oxygen bridges are replaced by sulfur bridges, such as

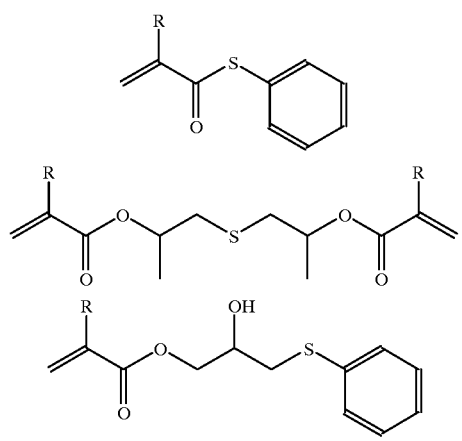

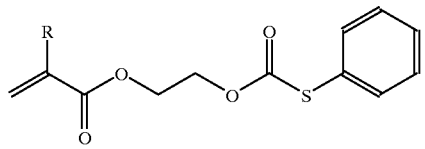

In the above formulae, R is hydrogen or methyl. The phenyl rings of these monomers can bear further substituents. Such substituents are able to modify the properties of the addition polymers formed from these monomers within certain limits. They can therefore be used in a specific manner to optimize especially the application properties of the effect colorants of the invention.

Suitable substituents are especially CN, halogen, $NO_2$, alkyl having from one to twenty carbon atoms, alkoxy having from one to twenty carbon atoms, carboxyalkyl having from one to twenty carbon atoms, carbonylalkyl having from one to twenty carbon atoms or —OCOO-alkyl having from one to twenty carbon atoms. The alkyl chains of these radicals can in turn be substituted or unsubstituted or interrupted by bivalent hetero atoms or groups such as —O—, —S—, —NH—, —COO—, —OCO— or —OCOO— in nonadjacent positions.

Group c): monomers having hetero atoms, such as vinyl chloride, vinylidene chloride, acrylonitrile, methacrylonitrile, acrylic acid, methacrylic acid, acrylamide and methacrylamide or organometallic compounds such as

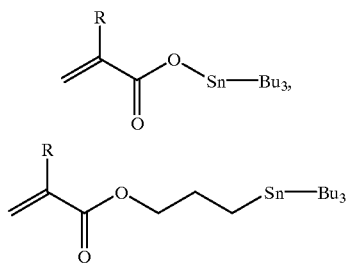

Group d): The refractive index of polymers can also be increased by incorporating polymerized units derived from carboxyl-containing monomers and converting the resulting "acidic" polymers into the corresponding salts with metals of higher atomic weight, for example with, preferably, K, Ca, Sr, Ba, Zn, Pb, Fe, Ni, Co, Cr, Cu, Mn, Sn or Cd.

The abovementioned monomers, which make a high contribution to the refractive index of the polymers prepared therefrom, can be homopolymerized or mutually copolymerized. They can also be copolymerized with a certain proportion of monomers which make a lesser contribution to the refractive index. Such copolymerizable monomers making a lesser contribution to the refractive index include, for example, acrylates, methacrylates or vinyl ethers or vinyl esters having purely aliphatic moieties.

In preferred embodiments of the present invention, at least the core polymers are crosslinked, but preferably the polymers of both core and shell are crosslinked.

The addition polymers are, in principle, crosslinked in the same way as the polycondensates, as described above. The crosslinking can be effected at the same time as the addition polymerization or in a separate step following the addition polymerization (postcrosslinking). A particular form is corsslinking without addition substances (self-crossliking).

In this case, latently crosslinkable functional groups are already present in the polymer. For various applications of the effect colorants of the invention it is advantageous to crosslink the core polymers during the addition polymerization and the shell polymers subsequently.

If the addition polymer contains appropriate complementary groups, then the above-mentioned reactive crosslinkers suitable for crosslinking polycondensates, such as compounds having epoxide, cyanate, isocyanate or isothiocyanate groups, can also be used for crosslinking addition polymers.

In addition, suitable crosslinking agents for free-radically formed addition polymers include any bi- or polyfunctional compounds which are copolymerizable with the abovementioned monomers or which can react subsequently with the polymers with crosslinking.

In what follows, examples of suitable crosslinkers are presented, classified into groups:

Group 1: Bisacrylates, bismethacrylates and bisvinyl ethers of aromatic or aliphatic di- or polyhydroxy compounds, especially of butanediol (butanediol di(meth)acrylate, butanediol bisvinyl ether), hexanediol (hexanediol di(meth)acrylate, hexanediol bisvinyl ether), pentaerythritol, hydroquinone, bishydroxyphenylmethane, bishydroxyphenyl ether, bishydroxymethylbenzene, bisphenol A or with ethylene oxide spacers, propylene oxide spacers or mixed etyhlene oxide/propylene oxide spacers.

Further crosslinkers of this group include, for example, di- or polyvinyl compounds such as divinyl benzene or else methylenebisacrylamide, triallyl cyanurate, divinylethyleneurea, trimethylolpropane tri(meth)acrylate, trimethylolpropane trivinyl ether, pentaerythritol tetra(meth)acrylate, pentaerythritol tetravinyl ether and also crosslinkers having two or more different reactive ends such as (meth)allyl (meth)acrylates of the formulae

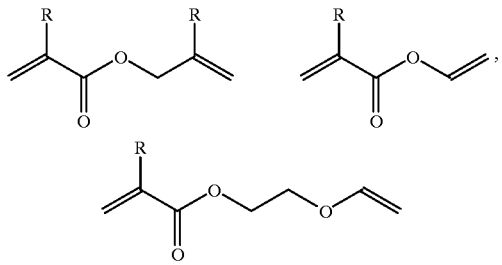

where R is hydrogen or methyl.

Group 2: Reactive crosslinkers which act crosslinkingly, but mostly post-crosslinkingly, for example on heating or drying, and which are co-polymerized into the core or shell polymers.

Examples thereof are: N-methylol(meth)acrylamide, acrylamidoglycolic acid and also ethers and/or esters thereof with $C_1$–$C_6$-alcohols, acetacetoxyethylmeth-acrylamide (AAEM), diacetoneacrylamide (DAAM), glycidyl methacrylate (GMA), methacryloyloxypropyltrimethoxysilane (MEMO), vinyltrimethoxysilane, m-isopropenylbenzyl isocyanate (TMI).

Group 3: Carboxylic acid groups incorporated in the polymer by copolymerization of unsaturated carboxylic acids are crosslinked in bridge fashion via multivalent metal ions. Unsaturated carboxylic acids used for this purpose are preferably acrylic acid, methacrylic acid, maleic anhydride, itaconic acid and fumaric acid. Suitable metal ions are Mg, Ca, Sr, Ba, Zn, Pb, Fe, Ni, Co, Cr, Cu, Mn, Sn, Cd. Particular preference is given to Ca, Mg and Zn.

Group 4: Postcrosslinking additives. They are bis- or higher-functionalized additives which react with the polymer (by addition or preferably condensation reactions) irreversibly to form a network. Examples thereof are compounds which have at least two of the following reactive groups per molecule: epoxide, aziridine, isocyanate, acid chloride, carboduimide or carbonyl groups, also, for example, 3,4-dihydroxyimidazolinone and its derivatives (®Fixapret@ products from BASF).

As explained above, postcrosslinkers having reactive groups such as epoxide and isocyanate groups need complementary reactive groups in the polymer to be crosslinked. For instance, isocyanates react with alcohols to form urethanes, with amines to form urea derivatives, whereas epoxides react with these complementary groups to form hydroxy ethers and hydroxy amines, respectively.

Postcrosslinking is also to be understood as encompassing photochemical curing, an oxidative curing or an air- or moisture-induced curing of the systems.

The above-specified monomers and crosslinkers can be combined and (co)polymerized with one another in any desired and specific manner so as to obtain an optionally crosslinked (co)polymer having the desired refractive index and the required stability criteria and mechanical properties.

It is also possible to additionally copolymerize further commonly used monomers, for example acrylates, methacrylates, vinyl esters, butadiene, ethylene or styrene, in order, for example, to adjust the glass transition temperature or the mechanical properties of the core and shell polymers as necessary.

The present invention further provides for the use of the core-shell particles of the invention or their preparations for producing protective and/or decorative coatings. A process for producing decorative and/or protective coatings comprises applying a coating composition in a conventional manner to the pretreated or unpretreated material to be protected, which comprises applying, as coating composition, core-shell particles of the invention or a preparation of the latter, removing any dispersing and/or diluting medium present and subsequently filming and if desired cross-linking the shell material and so orienting the cores.

Substrates which can be provided with a decorative and/or protective coating in this way include for example paper, cardboard, leather, films, cellophane, textiles, plastics, glass, ceramics or metals.

The present invention further provides for the use of the core-shell particles of the invention or their preparations for preparing effect colorants.

The process for preparing a preferred effect colorant in pigment form comprises the following steps:
a) applying the core-shell particles of the invention or a preparation of the latter to a substrate of low adhesivity,
b) if necessary evaporating or expelling any solvent or diluent present in the applied layer,
c) converting the shell material of the core-shell particles into a liquid, soft or viscoelastic matrix phase,
d) orienting the cores of the core-shell particles at least into domains of regular structure,
e) curing the shell material to fix the regular core structure,
f) detaching the cured film from the substrate, and
g) comminuting the detached film to the desired particle size if a pigment or powder is to be prepared.

In a particular embodiment of this process for preparing effect colorants in the form of a pigment, the application is effected as per step a) in the form of a multiplicity of dots of the size of the desired pigment particles to facilitate or obviate step g).

Preferably, in the inventive preparation of the effect pigments, the shell material is chosen so that the pigments obtained, following filming and optionally crosslinking, have a polymer matrix which is resistant to aqueous and organic media. The pigment particles preparable according to the invention have a platelet-shaped structure, i.e., their thickness is distinctly less than their lateral dimension. The pigment particles obtained are advantageously from 1 to 1000 µm, preferably from 1 to 100 µm, especially from 10 to 100 µm, in thickness. The lateral dimension is within the range from 5 to 5000 µm, preferably within the range from 20 to 3000 µm, especially within the range from 50 to 1000 µm.

They are obtained, for example, by conventionally comminuting a sheetlike film formed from a powder of the invention. Pigments thus obtained surprisingly have high lightfastness.

It is possible to prepare an effect colorant in the form of a film by selecting a shell polymer which is toughly elastic in the cured state and omitting step g).

The effect colorants and coatings preparable from the core-shell particles of the invention or their preparations exhibit very interesting color effects which depend on the angle of incidence and/or the viewing angle and which are due to interference at the spatial lattice formed by the core particles in the matrix material. The angle-dependent color change is particularly impressive when such an effect dye is applied to a dark, e.g., black, substrate, i.e., to a nonselectively absorbing substrate.

The conversion required, by the described uses, of the shell material of the core-shell particles into the matrix of a coating, of a pigment particle or of a sheet material, i.e., the filming, can be carried out routinely.

In the simplest case, when the shell material comprises matrix polymers only, the filming is effected by melting or softening the shell of the core-shell particles, orienting the cores in the matrix and cooling and hence solidifying the molten matrix. On using a, preferably aqueous, dispersion of inventive core-shell particles whose shell polymer has a glass transition temperature below room temperature, the dispersion may merely need to be allowed to dry in order that process steps a) to e) take place to form an effect colorant layer suitable for further processing.

When the shell material further comprises polymer precursors, these are converted into additional matrix polymer by (further) addition polymerization or condensation after the shell substance has melted.

The examples hereinbelow illustrate the invention. The emulsifiers used in the examples have the following compositions:

Emulsifier 1:30% strength by weight solution of the sodium salt of an ethoxylated and sulfated nonylphenol with about 25 mol/mol of ethylene oxide units.

The particle size distributions were determined with the aid of an analytical ultra-centrifuge, and the values obtained were used to calculate the PDI value according to the above-specified formula $PDI=(D_{90}-D_{10})/D_{50}$.

Solutions are aqueous solutions, unless otherwise stated.

The pphm used in the examples denotes parts by weight based on 100 parts by weight of total monomers.

Key to the abbreviations used for monomers: AS=acrylic acid, n—BA=n—butyl acrylate, DVB=divinylbenzene, EA=ethyl acrylate, MAS=methacrylic acid, MAMol=N-methylolmethacrylamide, NaPS=sodium persulfate.

EXAMPLE 1A

Preparing a Dispersion of Core Particles

A glass reactor equipped with anchor stirrer, thermometer, gas inlet tube, dropping funnel and reflux condenser is charged with a dispersion of 0.9 g (0.20 pphm) of polystyrene seed (particle size: 30 nm) in 500 ml of water and heated with stirring in a heating bath while nitrogen is introduced to displace air. Once the heating bath to has reached the preset temperature of 85° C. and the reactor contents have reached a temperature of 80° C., the introduction of nitrogen is discontinued and the simultaneous dropwise addition is commenced of an emulsion of 445.5 g of styrene (99.0% by weight), 4.5 g of divinylbenzene (1.0% by weight) and 14.5 g of emulsifier 1 (1.0 pphm) in 501.3 ml of water and 54.0 g of a 2.5% strength by weight aqueous solution of sodium persulfate (0.3 pphm) and continued for 3 hours. On completion of the addition of the solutions, the polymerization is continued at 85° C. for a further 2 hours and then cooled down to room temperature.

The Dispersion Has The Following Properties:

Solids content: 29.6% by weight
Particle size: 255 nm
Coagulum fraction: <1 g
pH: 2.3
Polydispersity index: 0.13
Refractive index n: 1.59

Example 1A was repeated a number of times with different seed particle concentrations. Table 1 below provides an overview of the experimental results obtained.

TABLE 1

| Ex. No. | 1A | 1B | 1C | 1D | 1E | 1F | 1G |
|---|---|---|---|---|---|---|---|
| Seed conc. wt % | 0.20 | 0.15 | 0.10 | 0.053 | 0.30 | 0.53 | 3.16 |
| Solids content wt % | 28.8 | 28.4 | 28.5 | 29.4 | 29.3 | 30.0 | 28.6 |
| Particle size [nm] | 256 | 280 | 317 | 357 | 222 | 188 | 125 |
| PDI | 0.13 | — | — | 0.19 | — | — | 0.221 |

EXAMPLE 2A

Preparing a Dispersion of Core-shell Particles

A glass reactor provided with anchor stirrer, thermometer, gas inlet tube, dropping funnel and reflux condenser is charged with 300 g of the dispersion of core particles obtained in Example 1A and heated with stirring in a heating bath while nitrogen is introduced to displace the air.

Once the heating bath has reached the preset temperature of 85° C. and the reactor contents have reached a temperature of 80° C., the introduction of nitrogen is discontinued and the simultaneous dropwise addition is commenced of a) a mixture of 84.7 g (98.0% by weight) of n-butyl acrylate, 0.86 (1.0% by weight) of acrylic acid, 5.76 g (1.0% by weight) of a 15% strength by weight solution of N-methylolmethacrylamide, 2.86 g of a 31% strength by weight solution (0.97 pphm) of emulsifier 1 and 12.4 g of water and also b) 17.3 g of a 2.5% strength by weight aqueous solution of sodium persulfate (0.5 pphm) and continued for 1.5 hours.

On completion of the addition of the solutions, the polymerization is continued at 85° C. for a further 3 hours. Thereafter, the resulting dispersion of core-shell particles is cooled down to room temperature. The dispersion has the following properties:

Solids content: 40.6% by weight
Particle size: 307 nm
Polydispersity index: 0.16
Weight ratio of core:shell: 1:1 (calculated)
Refractive index n
of shell polymer: 1.44

Example 2A was repeated twice with different core particle concentrations and core:shell weight ratios. Table 2 below provides an overview of the experimental results obtained.

TABLE 2

| Ex. No. | 2A | 2B | 2C |
|---|---|---|---|
| Core fraction [wt %] | 100.0 | 133.3 | 225.0 |
| n-BA [wt %] | 98.0 | 98.0 | 98.0 |
| AS [wt %] | 1.0 | 1.0 | 1.0 |
| MAMol [wt %] | 1.0 | 1.0 | 1.0 |
| Shell:core ratio | 1:1 | 0.75:1 | 0.44:1 |
| Particle size [nm] | 301 | 308 | 284 |
| PDI | 0.162 | 0.137 | 0.144 |
| Solids content [wt %] | 39.4 | 40.6 | 35.2 |

EXAMPLE 3

Producing a Solid Preparation of Core-shell Particles According to Invention 15 g of the dispersion obtained in Example 2C was dried at room temperature in a silicone rubber dish (7×15 cm). The residue forms a luminously effect-colored layer which was easy to comminute. The loose material obtained consists of irregularly shaped plateletlike particles of a solid preparation of the core-shell particles which comprises emulsifier. Redispersibility decreases further following a brief heat treatment (1 min at 120° C.). After comminution of the platelets to pigment particle size they can be used to prepare paints and inks. The coatings, prints and drawings produced therewith exhibit wonderfully luminous effect colors.

Similar solid preparations are obtained when the dispersion used above is freeze dried or spray dried under reduced pressure at 40° C. or less. The powder obtained by spray drying is made up of a loose accumulation of core-shell particle clusters in which the particles are disposed in a regular array resembling a crystal lattice.

EXAMPLE 4A

Filming the Core-shell Particles 15 g of the dispersion obtained in Example 2C are dried at room temperature in a silicone rubber dish by allowing the water to evaporate. The luminously effect-colored layer obtained is then heat-treated for 1 hour at 120° C. in a vacuum drying cabinet and then cooled down to room temperature.

The hard film obtained is mechanically stable and transparent and has a luminous color which varies with the illumination angle and the viewing angle. If this film is comminuted into particles the size of pigment particles, it can be used to prepare pigment effect colors. If the film is produced on an adhesive substrate, it will form a resistant protective and decorative coating thereon with a very appealing color effect. Similar films with somewhat modified color play are obtained on heat-treating the core-shell particle layer at 150° C. or 180° C. for 1 hour.

The example shows that a polymerization batch can be used directly as "liquid preparation" for producing effect colorants.

EXAMPLE 4B 15 g of the dispersion obtained in Example 2A are dried at room temperature in a silicone rubber dish. A luminously effect-colored layer of rubbery elasticity is obtained. On heat-treating this layer at 120° C. in a vacuum drying cabinet for 1 hour and then cooling down to room temperature, the elasticity increases and a slight color change is observed. On stretching the layer, the color changes from brown to green to violet with the stretch ratio.

EXAMPLE 4C 13.5 g of the dispersion obtained in Example 2A are mixed with 1.5 g of a finely divided, 20% strength by weight aqueous dispersion of a copolymer of 94% by weight of ethyl acrylate and 6% by weight of methacrylic acid having an average particle size of 30 nmn and a glass transition temperature of about 0° C., and the mixture is dried at room temperature in a silicone rubber dish. The effect-colored layer obtained is mechanically even stronger than that obtained in Example 4B. This example illustrates the facilitation and improvement of filming through the addition of a copolymer.

Further increasing the proportion of ethyl acrylate/methacrylic acid dispersion added gives layers whose color changes from the deep brown and green shades to a silky metallic effect.

EXAMPLE 4D 20 g of the dispersion obtained in Example 2A are mixed with 2 g of diethylene glycol diethyl ether (DGDE), diluted with 10 g of water, and the mixture is dried at room temperature in a silicone rubber dish. The luminously effect-colored layer obtained is mechanically even stronger than that obtained in Example 4B. This example shows that the addition of DGDE likewise permits shell polymer filming at room temperature, but has only a minimal effect on the color of the filmed layer.

We claim:

1. Core-shell particles, whose core and shell materials are capable of forming a two-phase system, the shell material being filmable, the core being essentially form-stable under shell-filming conditions and being swellable by the shell material by not more than 10% of its original value when embedded in the shell material, if at all the cores having a monodisperse size distribution, and there being a difference between the refractive indices of the core material and of the shell material, and wherein the weight ratio of core:shell in the particles is within the range from 1⅓:1 to 20:1.

2. Core-shell particles as claimed in claim 1, wherein the difference Δn between the refractive indices of the shell and core materials is at least 0.001.

3. Core-shell particles as claimed in claim 2, wherein the difference Δn between the refractive indices of the shell and core materials is at least 0.01.

4. Core-shell particles as claimed in claim 3, wherein the difference Δn between the refractive indices of the shell and core materials is at least 0.1.

5. Core-shell particles as claimed in claim 1, wherein the core of the core-shell particles is from 100 to 700 nm in size.

6. Core-shell particles as claimed in claim 5, wherein the core of the core-shell particles is from 150 to 500 nm in size.

7. Core-shell particles as claimed in claim 6, wherein the core of the core shell particles is from 200 to 400 nm in size.

8. Core-shell particles as claimed in claim 1, wherein the cores of the core-shell particles have a polydispersity index PDI of below 0.4.

9. Core-shell particles as claimed in claim 8, wherein the cores of the core-shell particles have a polydispersity index PDI of below 0.3.

10. Core-shell particles as claimed in claim 9, wherein the cores of the core-shell particles have a polydispersity index PDI of below 0.2.

11. Core-shell particles as claimed in claim 1, wherein the weight ratio of core:shell in the particles is within the range from 2:1 to 10:1.

12. Core-shell particles as claimed in claim 11, wherein the weight ratio of core:shell in the particles is within the range from 2:5:1 to 5:1.

13. Core-shell particles as claimed in claim 1, wherein the core comprises one or more polymers (core polymers), and the shell comprises one or more polymers (shell polymers) or polymer precursors and optionally up to 30% by weight, of auxiliary and additive substances and the shell, when in a nonswelling environment at room temperature, is essentially form-stable and nontacky.

14. Core-shell particles as claimed in claim 13, wherein the core polymers are crosslinked.

15. Core-shell particles as claimed in claim 13, wherein the shell polymers or polymer precursors are optionally present up to 20% by weight.

16. Core-shell particles as claimed in claim 1, obtained by emulsion polymerization in an aqueous medium.

17. Solid preparations comprising from 70 to 99% by weight, of core-shell particles as claimed in claim 1 and from 30 to 1% by weight, of a mixture of auxiliary and/or additive substances which is solid at standard temperature.

18. Solid preparations as claimed in claim 17, wherein the core-shell particles comprise from 80 to 95% by weight.

19. Solid preparations as claimed in claim 17, wherein the core-shell particles comprise from 20 to 5% by weight.

20. A process for producing decorative and/or protective coatings by applying a coating composition in a conventional manner to the pretreated or unpretreated material to be protected, which comprises applying the preparation of claim 17, removing any liquid dispersing and/or diluting medium present and subsequently filming and if desired crosslinking the shell material and so orienting the cores.

21. A process for preparing an effect colorant, comprising the following steps:
   a) applying the preparation of claim 17, to a substrate of low adhesivity,
   b) if necessary evaporating or expelling any solvent or diluent present in the applied layer,
   c) converting the shell material of the core-shell particles into a liquid, soft or viscoelastic matrix phase,
   d) orienting the cores of the core-shell particles at least into domains of regular structure,
   e) curing the shell material to fix the regular core structure,
   f) detaching the cured film from the substrate, and
   g) comminuting the detached film to the desired particle size if a pigment or powder is to be prepared.

22. The process as claimed in claim 21, wherein an effect colorant is prepared in the form of a pigment by effecting the applying as per step a) in the form of a multiplicity of dots in the size of the desired pigment particles to facilitate or obviate step g).

23. The process as claimed in claim 21, wherein an effect colorant is prepared in the form of a film by selecting a shell polymer which is elastically deformable in the cured state and omitting step g).

24. Pasty or fluidic preparations comprising from 5 to 75% by weight, of core-shell particles as claimed in claim 1 and from 95 to 25% by weight, of a mixture of dissolving, dispersing, auxiliary and/or additive substances which is liquid at standard temperature or becomes liquid at elevated temperature.

25. Pasty or fluidic preparations as claimed in claim 24, wherein the preparations are spreadable, sprayable or pourable.

26. Pasty or fluidic preparations as claimed in claim 24, comprising 10 to 65% by weight of core-shell particles.

27. Pasty or fluidic preparations as claimed in claim 26, comprising 20 to 50% by weight of core-shell particles.

28. Pasty or fluidic preparations as claimed in claim 24, comprising 90 to 35% by weight of the mixture of dissolving, dispersing, auxiliary and/or additive substances.

29. Pasty or fluidic preparations as claimed in claim 28, comprising 80 to 50% by weight of the mixture of dissolving, dispersing, auxiliary and/or additive substances.

30. A process for producing decorative and/or protective coatings by applying a coating composition in a conventional manner to the pretreated or unpretreated material to be protected, which comprises applying the preparation of claim 24, removing any liquid dispersing and/or diluting medium present and subsequently filming and if desired crosslinking the shell material and so orienting the cores.

31. A process for preparing an effect colorant, comprising the following steps:
   a) applying the preparation of claim 24 to a substrate of low adhesivity,
   b) if necessary evaporating or expelling any solvent or diluent present in the applied layer,
   c) converting the shell material of the core-shell particles into a liquid, soft or viscoelastic matrix phase,
   d) orienting the cores of the core-shell particles at least into domains of regular structure,
   e) curing the shell material to fix the regular core structure,
   f) detaching the cured film from the substrate, and
   g) comminuting the detached film to the desired particle size if a pigment or powder is to be prepared.

32. The process as claimed in claim 31, wherein an effect colorant is prepared in the form of a pigment by effecting the applying as per step a) in the form of a multiplicity of dots in the size of the desired pigment particles to facilitate or obviate step g).

33. The process as claimed in claim 31, wherein an effect colorant is prepared in the form of a film by selecting a shell polymer which is elastically deformable in the cured state and omitting step g).

34. A process for preparing the core-shell particles of claim 1 by homogenizing core polymer particles prefabricated in a separate step with monomers or prepolymers of the shell polymers and if desired auxiliary and/or additive substances in an inert liquid reaction medium and incipiently or completely polymerizing the polymer precursors under polymerization conditions such that the shell polymers or polymer precursors become deposited on the core particles, which comprises selecting the monomers and/or prepolymers according to amount and type in such a way that the shell material be filmable, the core be form-stable under shell-filming conditions and be swellable by the shell material by not more than 10% of its original value when embedded in the shell material, if at all, the cores having a monodisperse size distribution, and there be a difference between the refractive indices of the core material and of the shell material.

35. A process as claimed in claim 34, wherein the process is carried out as a two-step one-pot process, the core polymer particles being prepared from the selected polymer precursors (monomers and/or prepolymers) in the first reaction step and then being further processed as claimed in claim 34.

36. The process as claimed in claim 34, wherein the polymerization of the shell polymers is carried out in the presence of all or some of the auxiliary and/or additive substances present in the preparation and optionally dispersing or diluting media, or these are wholly or partly added during or on completion of the polymerization, in which case the adds are chosen so that their mixture is solid or fluidic as required, and the inert reaction medium is wholly or partly removed after completion of the polymerization.

37. The process as claimed in claim 34, wherein the inert reaction medium is removed by evaporation, optionally under reduced pressure, by freeze drying or by spray drying.

38. A process for producing decorative and/or protective coatings by applying a coating composition in a conventional manner to the pretreated or unpretreated material to be protected, which comprises applying core-shell particles of claim 1, removing any liquid dispersing and/or diluting medium present and subsequently filming and if desired crosslinking the shell material and so orienting the cores.

39. A process for preparing an effect colorant, comprising the following steps:
   a) applying the core-shell particles of claim 1 to a substrate of low adhesivity,
   b) if necessary evaporating or expelling any solvent or diluent present in the applied layer,
   c) converting the shell material of the core-shell particles into a liquid, soft or viscoelastic matrix phase,
   d) orienting the cores of the core-shell particles at least into domains of regular structure,
   e) curing the shell material to fix the regular core structure,
   f) detaching the cured film from the substrate, and
   g) comminuting the detached film to the desired particle size if a pigment or powder is to be prepared.

40. The process as claimed in claim 39, wherein an effect colorant is prepared in the form of a pigment by effecting the applying as per step a) in the form of a multiplicity of dots in the size of the desired pigment particles to facilitate or obviate step g).

41. The process as claimed in claim 39, wherein an effect colorant is prepared in the form of a film by selecting a shell polymer which is elastically deformable in the cured state and omitting step g).

* * * * *